UNITED STATES PATENT OFFICE 2,706,244
Patented Apr. 12, 1955

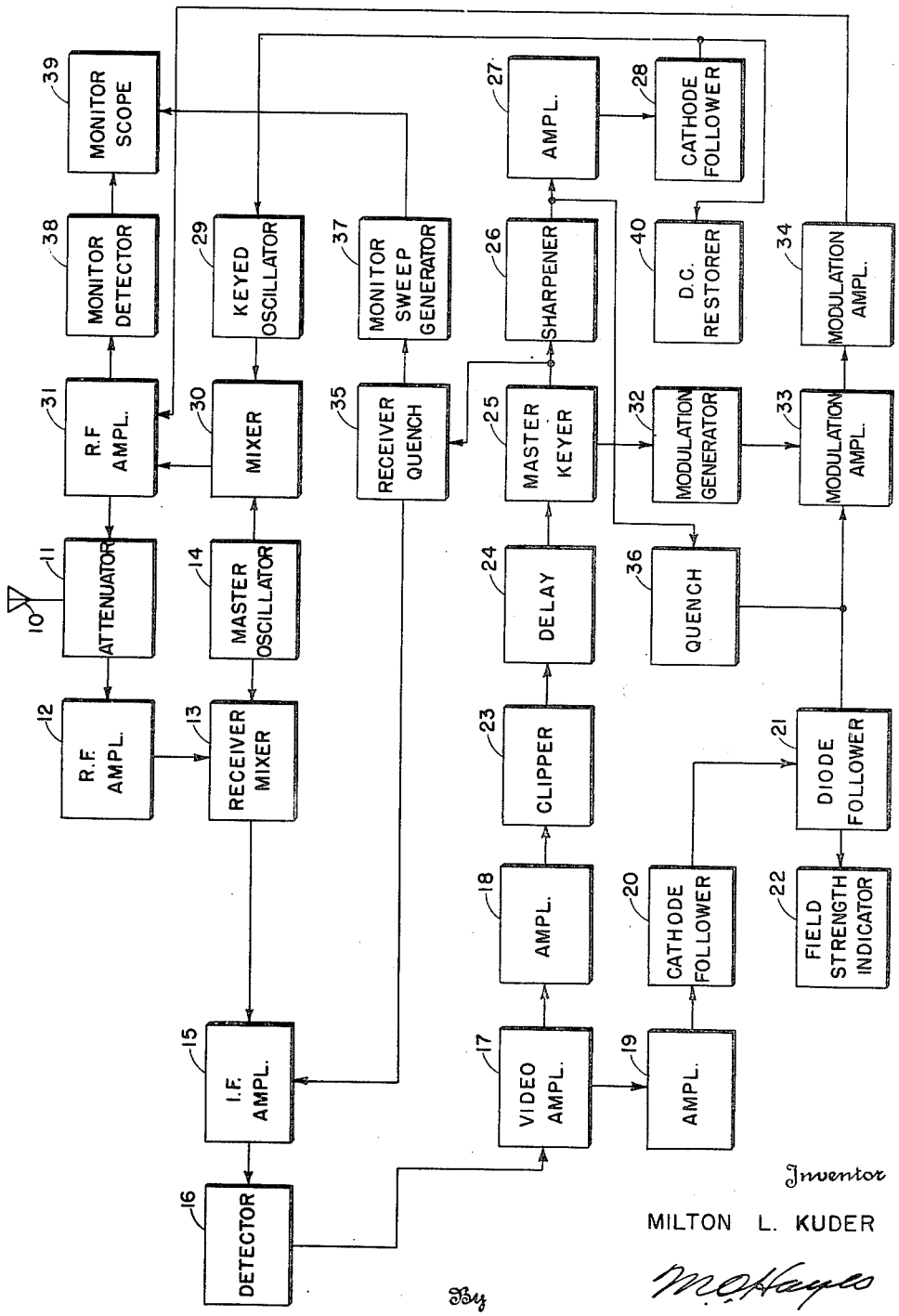

2,706,244

PULSE TRANSPONDOR

Milton L. Kuder, Washington, D. C.

Application February 21, 1946, Serial No. 649,446

8 Claims. (Cl. 250—15)

(Granted under Title 35, U. S. Code (1952), sec. 266)

This invention relates in general to radio transpondor systems, and more particularly to radio transpondor systems adapted to receive radiation signals and retransmit coded response signals in time relation to the reception of the radiation signals.

An object of the invention is to provide a novel signal generator adapted to be actuated by a received signal to generate a signal bearing a predetermined amplitude relationship with the amplitude of the received pulse.

Another object of the invention is to provide a novel signal generator adapted to be actuated by a received radiation pulse and generate a coded signal substantially coincident in time with the reception of the radiation pulse.

Another object of this invention is to provide a novel means for receiving transmitted signals, and coding and retransmitting signals at the same frequency bearing a predetermined constant time relationship with the transmitted signals.

Another object of the invention is to provide a novel signal generator adapted to be actuated by recurring radiation pulses to generate and transmit coded signals substantially coincident in time with the reception of the received pulses and having means for maintaining the amplitude of the transmitted pulses continuously proportional to the instantaneous amplitude of the received pulses.

Other objects, advantages and capabilities of the invention will become apparent from the following description, taken in conjunction with the accompanying drawings, showing only a preferred embodiment of the invention, in which the figure is a block diagram of the transpondor forming the present invention.

Referring now to the figure showing the block diagram of the transpondor system, an antenna 10 is provided to couple recurring signal pulses, such as radio interrogator pulses, pulse communication signals, radar pulses, and the like, through a linear variable attenuator 11 designed to reduce the amplitude of the signal pulses by a preselected amount. This decrease in amplitude expands the range of signal amplitudes through which the automatic pulse amplitude control channel, to be later described, is effective to maintain the operative amplitude relationship between the received signal and the retransmitted signals. The pulse amplitude control channel is designed to control automatically the amplitude of the output pulse of the transmitter for a predetermined range of amplitude of input signals to the control channel. The variable attenuator permits the amplitude of signals outside of this range to be reduced to an amplitude within the operating range when coupling the signals from the antenna 10 into the receiver, while acting as an amplifier when coupling signals generated within the transpondor system to the antenna 10. This effectively extends the range of the pulse amplitude control channel. This attenuator may consist of three magnetically coupled inductors or transformers, one having a variable inductor or variable coupling element associated therewith to enable manual control of the magnitude of attenuation of the signal pulses to be effected. The antenna may be coupled across the movable or variable inductor with one of the remaining inductors arranged to inductively couple the signals picked up by the antenna to the transpondor system and the third inductor to couple signals generated in the transpondor back into the antenna. It will be apparent that if the fixed inductors are identical, the deamplification suffered by incoming received signals will be equal to the amplification of the outgoing signals from the transpondor.

The reduced amplitude pulses are coupled from the attenuator 11 to a conventional superheterodyne receiver comprising a radio-frequency amplifier 12, a mixer 13, such as a multi-grid tube, in which the radio-frequency pulses are mixed with oscillations from a master oscillator 14, an intermediate-frequency amplifier 15 and an infinite impedance detector 16 to a video amplifier 17. The video amplifier 17 is designed to provide two outputs by coupling from two points on the plate circuit resistor, one providing high amplitude output pulses from the superheterodyne receiver circuit and the other low amplitude pulses. The high amplitude pulses are coupled through an amplifier 18 to a keyer channel, to be later described. The low amplitude output is coupled to the pulse amplitude control channel through an amplifier 19 to an amplitude control voltage generator channel comprising a cathode follower 20 and a diode follower 21. The diode follower comprises a series diode and charging condenser circuit, such as a peak rectifier, designed so that the condenser is substantially instantaneously charged up to the peak voltage level of the pulses fed thereto and retains that charge until discharged by a quench circuit, to be later described. This D. C. voltage level is coupled both to the modulator stages and to a field strength indicator 22, such as a peak reading vacuum tube voltmeter circuit and ammeter, provided to visually indicate the amplitude of the received pulses. The field strength indicator 22 may be calibrated as desired to indicate the proper attenuator setting to prevent overloading of the receiver or to permit accurate tuning of the transpondor unit to the frequency of the interrogating pulses by noting the comparative signal amplitudes for different frequency settings.

The high amplitude pulse output of video amplifier 17 is coupled through the amplifier 18 to a clipper stage 23, such as an overdriven amplifier, for rendering all the pulses coupled therethrough of constant amplitude. These constant amplitude pulses are then fed through a phase delay stage 24 consisting of a pair of amplifiers with phase shifting grid circuits for delaying the pulses for a short time relative to those coupled through the pulse amplitude control channel. The delayed pulses are then coupled to a master keyer stage 25, which may be an electronic switch or one-shot multivibrator designed to produce a gating pulse of preselected duration. A positive gating pulse is coupled from the keyer 25 through a sharpener stage 26, another overdriven amplifier, for rendering the sides of the gating pulse steeper, through an amplifier 27 and a cathode follower 28 to gate a keyed oscillator 29 by applying the positive pulse to a grid of the oscillator tube which is normally biased to cutoff. The keyed oscillator 29 is set to oscillate at the frequency of the intermediate frequency amplifier 15 of the receiver and generates an oscillatory output which is mixed with the oscillations generated by master oscillator 14 in mixer stage 30 to produce an output from the mixer 30 having a frequency equal to the sum of the two frequencies mixed, that is, exactly equal to the frequency of the input or interrogator pulses picked up by the antenna 10. This mixer output is fed through a radio-frequency amplifier 31 where it is appropriately modulated as explained hereinafter. The modulated signal is then fed to the attenuator 11 where it is amplified by an amount equal to the amount the received signal was deamplified when coupled from the antenna 10 to the receiver R.-F. amplifier 12.

A negative gating pulse generated by the master keyer 25 is likewise employed to gate a servile modulation generator 32 which is operative to generate a coded modulation voltage when energized by the gating waveform. The modulation generator 32 may be mechanically or electronically coded to generate the desired modulation pattern. As an exemplary embodiment of a modulation generator that may be employed with this system, the positive gating pulse may be coupled to the input grid of a one-shot multivibrator having a normally cutoff sine-wave oscillator gated into conduction by the output of the multivibrator. This coded modulation waveform is coupled through a modulation amplifier 33, a multi-grid variable transconductance tube, the grid bias on one grid, and thus the amplification, of which is controlled by coupling the D. C. voltage generated in the diode follower stage 21 in the automatic pulse amplitude control channel to the grid of amplifier 33 to vary the amplitude of the coded modulation waveform as a function of the amplitude of the received interrogator pulses. The amplitude adjusted waveform thus produced is then coupled through another modulation amplifier stage 34 to the radio-frequency amplifier 31 where the modulation waveform controls the amplitude of the sum frequency oscillations from the output of the mixer 30. These code modulated oscillations are reradiated by the antenna 10 with only a slight delay relative to the reception of the interrogator pulses, thus producing for each received pulse a radio frequency signal with an envelope having an amplitude proportional to that of the respective received pulse.

In order to prevent the reradiated pulses from being coupled back into the receiver and automatic pulse amplitude control channels, thereby altering the control voltage generated in the diode follower 21 by distorting the charge on the charging condenser whereby it is no longer proportional to the true amplitude of the interrogator pulses, the positive gate waveform generated by master keyer 25 is also fed to a receiver quench amplifier 35 which inverts and amplifies the positive gating pulse. The negative pulse thus produced is coupled to the grids of several stages of the intermediate frequency strip 15 to bias the receiver below cutoff during the period when pulses are being retransmitted.

A quench tube 36 having a short time constant or differentiating input circuit is coupled to the output of sharpener stage 26 and in shunt with the condenser of diode follower stage 21 to trigger the quench tube 36 and discharge the condenser coincident with the occurrence of the trailing edge of the gating pulse generated by keyer 25 to enable the pulse amplitude control circuit to accurately follow the amplitude of each individual interrogator pulse.

Visual monitoring means may be provided to enable the retransmitted pulse to be observed, by providing a high speed sweep generator 37 gated by the negative output pulse of the receiver quench stage 35, and a detector 38 for detecting the envelope of the radio-frequency amplifier 31 output waveform, the detected envelope being applied to the vertical deflection plates of a monitor oscilloscope 39 and the sweep output of sweep generator 37 applied to the horizontal deflection plates of the oscilloscope 39.

A D. C. restorer 40 is coupled to the output of the cathode follower 28 between the coupling condenser at the output of the cathode follower 28 and the grid of the keyed oscillator 29 and comprises a diode coupled between the coupling lead and ground to prevent the output coupling capacitor from becoming charged up due to the current flowing therethrough when the gating pulse is applied to the keyed oscillator 29.

The short delay effected by delay stage 24 in triggering of the master keyer 25 is incorporated to allow the charging condenser in the diode follower to assume its appropriate charge and bias the modulation amplifier 33 to the proper operating point before the modulation generator is energized.

It will be apparent that the adjustment of the circuit components of the automatic pulse amplitude channel and of the attenuator may be varied to give any desired amplitude ratio between the received interrogator pulses and their corresponding retransmitted pulses, to adapt the unit for operation as a relay unit for pulse communication systems in which a constant amplification of the relayed pulse relative to that of the input pulse is desired.

The objective characteristics achieved by the invention are, therefore, the provision of a system for receiving pulse radiations, sensing the amplitude of the received radiations, establishing a different code of modulation, and retransmitting pulsed radiations modulated by the coded modulation and having an amplitude bearing a preselected relationship with the amplitude of the received radiations.

Various modifications may be made in the invention without departing from the spirit and scope thereof and it is desired, therefore, that only such limitations shall be placed thereon as are imposed by the prior art and are set forth in the appended claims.

The invention described herein may be manufactured and used by or for the Government of the United States of America for Government purposes without the payment of any royalty thereon or therefor.

What is claimed is:

1. A signal generator comprising a receiver for receiving radiation signals, oscillator means actuated by said received signals to generate reradiation signals at the frequency of said received signals, modulation means for generating modulating signals, sensing means for generating a control voltage proportional to said received signals, control means for said modulation means responsive to said control voltage to vary the amplitude of said modulating signals as a function of the amplitude of said received signals, and means controlled by said modulating signals for varying the amplitude of said reradiation signals to establish a fixed proportionality between the amplitude of the received signals and the amplitude of their corresponding reradiated signals.

2. A transpondor system comprising a receiver for receiving radiation impulses, oscillator means actuated by said received impulses to generate reradiation signals at the frequency of said received impulses, modulation means for generating modulating signals, sensing means responsive to the amplitude of said received impulses to generate a control voltage, control means for said modulation means responsive to said control voltage to vary the amplitude of said modulating signals as a function of the amplitude of said received impulses, and control means for said oscillator means responsive to said modulating signals to vary the amplitude of said reradiation signals to establish a fixed proportionality between the amplitude of the received impulses and the amplitude of their corresponding reradiated signals.

3. A signal generator comprising a receiver for receiving radiation signals, gating means actuated by said received signals to generate gating signals bearing a preselected time relationship with said received signals, signal generator means operative responsive to said gating signals for generating output signals at the frequency of said received signals and having a predetermined time duration, modulation means operative responsive to said gating signals for generating modulating signals having a predetermined shape, control means for said modulation means responsive to the amplitude of said received signals to vary the amplitude of said modulating signals as a function of the amplitude of said reived signals, and means for varying the amplitude of said output signals responsive to said modulating signals.

4. In a signal generator, the combination set forth in claim 3 wherein said modulation means comprises a coding means to selectively apply predetermined code characteristics to said modulating signals, and variable amplifying means controlled by said amplitude control means for varying the amplitude of said modulation in accordance with instantaneous amplitude variations of said received signals.

5. In a radio pulse transpondor, the combination set forth in claim 2, wherein said modulation means comprises coding means to selectively apply predetermined code characteristic modulation to said impulses, and variable amplifying means controlled by the voltage generated by said sensing means to vary the amplitude of said modulation in accordance with instantaneous amplitude variations of said received signals.

6. A radio pulse transpondor comprising a receiver for receiving transmitted pulses, gating means actuated by said received pulses for generating gating signals bearing a preselected time relationship with said received pulses, pulse generator means gated by said gating means to generate output pulses having a frequency equal to said received pulses, modulation means gated by said gating means, sensing means generating a control voltage proportional to the amplitude of said received pulses, control means for said modulation means responsive to said control voltage to vary the amplitude of said modulation as a function of the amplitude of said received pulses, and means for varying the amplitude of said output pulses responsive to said modulation.

7. A radio pulse transpondor comprising receiver means for receiving radiation signals, signal generator means operative responsive to a received signal to generate a reradiation signal having the same frequency as said received signal and a preselected time duration, sensing means for generating a control voltage proportional to the amplitude of said received signal, modulation means for generating a modulation wave form of predetermined shape, means responsive to said control voltage for amplifying said modulation wave form, and means for varying the amplitude of said reradiation signal responsive to said amplified modulation wave form.

8. A radio pulse transpondor comprising receiver means for receiving a radiation signal pulse, gating means responsive to said received pulse for generating a gating signal of preselected time duration and bearing a preselected time relationship with said received pulse, pulse generator means controlled by said gating signal for generating an output pulse having a frequency equal to said received pulse and a time duration equal to said gating signal, sensing means for generating a control voltage proportional to the amplitude of said received pulse, modulation means operative responsive to said gating signal for generating a modulating signal, control means for said modulation means responsive to said control voltage to control the amplitude of said modulating signal as a function of the amplitude of said received pulse, means varying the amplitude of said output pulse responsive to said modulating signal, and quench means for discharging said control voltage responsive to the termination of said gating signal.

References Cited in the file of this patent

UNITED STATES PATENTS

| | | |
|---|---|---|
| 2,222,761 | Beizer et al. | Nov. 26, 1940 |
| 2,239,772 | Beizer | Apr. 29, 1941 |
| 2,281,982 | Leyn | May 5, 1942 |
| 2,287,065 | Roberts | June 23, 1942 |
| 2,415,359 | Loughlin | Feb. 4, 1947 |
| 2,421,016 | Deloraine et al. | May 27, 1947 |

FOREIGN PATENTS

| | | |
|---|---|---|
| 449,322 | Great Britain | June 19, 1936 |